(12) United States Patent
Golinelli (10) Patent No.: US 7,412,778 B2
(45) Date of Patent: Aug. 19, 2008

(54) APPARATUS FOR DIMENSIONAL AND/OR GEOMETRIC CHECKING OF MECHANICAL PARTS

(75) Inventor: Guido Golinelli, Bologna (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 0 days.

(21) Appl. No.: 11/663,508

(22) PCT Filed: Sep. 29, 2005

(86) PCT No.: PCT/EP2005/054905

§ 371 (c)(1),
(2), (4) Date: Mar. 22, 2007

(87) PCT Pub. No.: WO2006/037749

PCT Pub. Date: Apr. 13, 2006

(65) Prior Publication Data

US 2007/0193050 A1    Aug. 23, 2007

(30) Foreign Application Priority Data

Oct. 1, 2004  (IT) ................ BO2004A0604
Dec. 21, 2004 (IT) ................ BO2004A0789

(51) Int. Cl.
    *G01B 3/00*    (2006.01)
(52) U.S. Cl. ........................... 33/543; 33/550; 33/552

(58) Field of Classification Search ............ 33/542–543, 33/544.4, 544.5, 544.6, 549–550, 552, 557, 33/558.01, 558.2, 560
See application file for complete search history.

(56) References Cited

U.S. PATENT DOCUMENTS

| | | | |
|---|---|---|---|
| 4,339,879 A | 7/1982 | Selleri | |
| 4,348,814 A | 9/1982 | Possati et al. | |
| 4,447,959 A | 5/1984 | Watanabe et al. | |
| 4,562,648 A | * 1/1986 | Danielli | 33/542 |
| 5,259,121 A | * 11/1993 | Possati et al. | 33/542 |

* cited by examiner

*Primary Examiner*—Yaritza Guadalupe-McCall
(74) *Attorney, Agent, or Firm*—Dickstein Shapiro LLP (57) ABSTRACT

A checking apparatus, for example a plug gauge, for checking diameters and/or geometrical features of mechanical parts includes a support structure (1) and checking means (20,21) coupled to the support structure, with mutually movable feelers (36) for contacting the surface of the part and transducer means for providing electrical signals. The support structure includes at least two studs (11,12) that achieve a guide along a longitudinal axis, and the checking means are coupled to the studs in a removable and adjustable way along such longitudinal axis. Several checking means can be coupled to the studs. A particular embodiment foresees three flanked studs and checking means coupled to pairs of adjacent studs. An adapting system allows the feelers to self-center on the part to be checked, for example the surface of a hole.

29 Claims, 7 Drawing Sheets

APPARATUS FOR DIMENSIONAL AND/OR GEOMETRIC CHECKING OF MECHANICAL PARTS

TECHNICAL FIELD

The present invention relates to an apparatus for checking diametral dimensions and/or shape errors of a mechanical piece, with a support structure defining a longitudinal axis, checking means with at least one cell coupled to the support structure and including at least two feelers adapted for contacting the surface of the piece and at least one transducer adapted for providing electric signals indicative of the position of the feelers.

The present invention also relates to a checking apparatus comprising feelers, in number of two or more, and a position transducer providing electric signals indicative of mutual displacements of the feelers along a measuring direction.

BACKGROUND ART

There are known in the art apparatuses, for example gauges of the so-called "plug" type, for checking the diameter of holes, for example before or after the machining in machine tools like grinding machines.

U.S. Pat. No. 4,348,814 discloses examples of such gauges, in which a measuring armset coupled to a support includes two feelers fixed to movable arms in diametral opposite positions, for contacting the surface of the hole to be checked. A transducer detects reciprocal displacements between the movable arms and provides electric signals indicative of the mutual position of the feelers.

U.S. Pat. No. 4,339,879 discloses a multiple plug gauge for checking a hole with cross-sections with different nominal diameter, including pairs of cells with one feeler each, coupled to a central support, at diametrically opposite positions, at portions of suitable diameter that form the support. The cells are coupled in a limitedly adjustable way, thanks to the coupling of fastening screws in shaped holes, so that the position of the measuring heads along a direction parallel to the axis of the plug gauge and along transversal directions can be adjusted about a reference position.

The structure of the multiple gauge described in the herein secondly mentioned U.S. patent is aimed at checking holes with well defined characteristics, matched by the shape and dimensions of the central support. Thus, although the position of the single cells on associated, dedicated portions of the support is limitedly adjustable, the overall structure of the gauge does not enable a flexible use for checking holes with different configurations. Furthermore, the structure and the utilized components limit the possibility of simultaneously performing the checking of diameters at nearby cross-sections along the longitudinal axis of the hole, a checking that is frequently requested, and generally carried out in ways that are not entirely satisfactory in terms of costs, time and convenience.

DISCLOSURE OF THE INVENTION

An object of the present invention is to provide a checking apparatus, as a plug gauge for the checking of diameters and shape errors of mechanical pieces, that overcomes the disadvantages of the known gauges and is particularly flexible in use, configurable in a simple and quick way, and that guarantees high standards of performance.

A further object of the present invention is to provide a checking apparatus with specific characteristics in terms of flexibility in use, for simultaneously checking two or more diameters of a hole at different cross-sections along the longitudinal axis of the hole, even at particularly short distances between one another.

A still further object of the present invention is to provide a checking apparatus with feelers that are able to properly and automatically cooperate with the part to be checked, avoiding wrong arrangements giving rise to errors, for example chord errors.

These and other objects are achieved by checking apparatuses according to claim 1 and claim 20.

A checking apparatus according to the invention attains specific advantages especially by virtue of its modularity characteristics, which will become clear from the description that follows.

A checking apparatus according to the invention includes a support structure carrying a longitudinal guide for checking means; such guide is implemented, for example, by means of two or more studs that are parallel to each other and that define a longitudinal axis of the apparatus. More specifically, the checking means are coupled, in a direct or indirect way, to components that are positioned and locked in positions selectable in a continuous way along the guide.

Hence, it is possible not only to position the checking means at different heights, but also to position more than one checking means along a same pair of adjacent studs.

Checking means utilized in the present invention include at least one cell with two oppositely arranged armsets, with associated feelers, for performing checkings on a same cross-section. According to a preferred embodiment, the armsets are of the parallelogram type, and to each pair of armsets there are associated the movable elements of an inductive transducer of known type, that provides electric signals indicative of the mutual position of the feelers.

The feelers can be directly coupled to parts of the armsets, or indirectly by means of mechanical transmission elements of suitable arrangement, shape and dimensions, to align the feelers in the position required by the checking.

Moreover, as previously mentioned, a checking apparatus according to the present invention can include more than two studs. For example, a configuration with three studs can be provided for. Such configuration features larger transversal overall dimensions, but can result more flexible with respect to a configuration with two studs, and presents important advantages in particular applications, enabling to arrange the feelers of several cells at cross-sections to be checked even very close to one another.

A checking apparatus according to the present invention can also include other known components, thereamong a centering and protection nosepiece, abutting surfaces for limiting the stroke of the feelers, thrust springs, electric wires by means of which electric signals indicative of the mutual position of the feelers are transmitted to processing and display devices.

Another checking apparatus according to the invention includes an adapting system coupled to one or more feelers that enables the latter(s) to move substantially along an adapting direction transversal with respect to a measuring direction. The feelers can be properly arranged in cooperation with the part to be checked, for example the surface of a hole, without the need of specific manual operations, so providing increased simplicity and convenience.

In preferred embodiments, checking apparatuses of the present invention including the adapting system can be plug gauges with armsets of both the parallelogram type and the lever type.

Other features of the invention will be more clear from the hereinafter provided detailed description with reference to the enclosed sheets of drawings, given by way of not limiting examples, wherein.

BRIEF DESCRIPTION OF THE DRAWINGS

Figure 1:
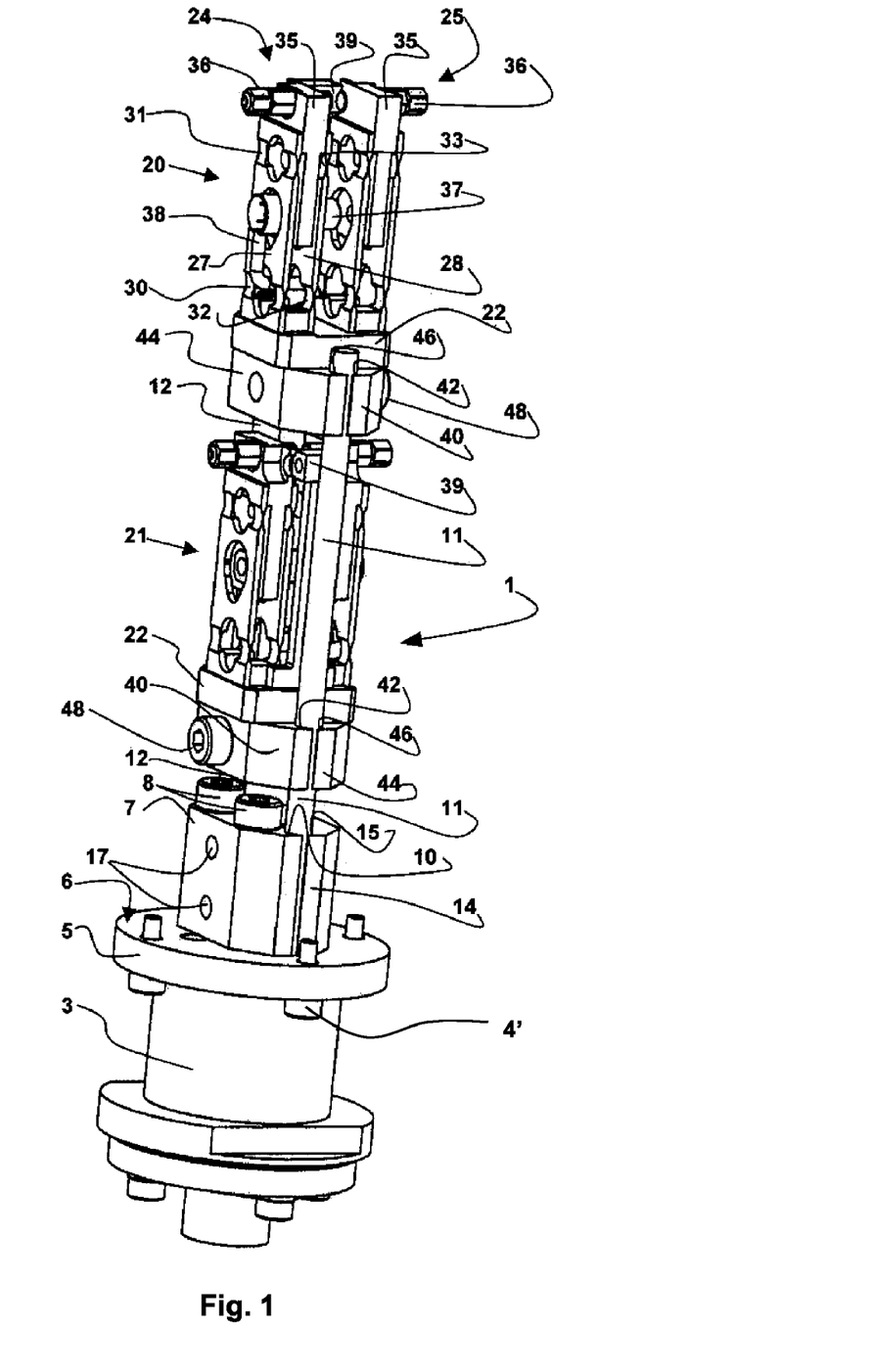
FIG. 1 is a perspective view of a plug gauge with two studs and a specific configuration, according to a first preferred embodiment of the invention, with some details omitted for the sake of clarity.
Figure 2:
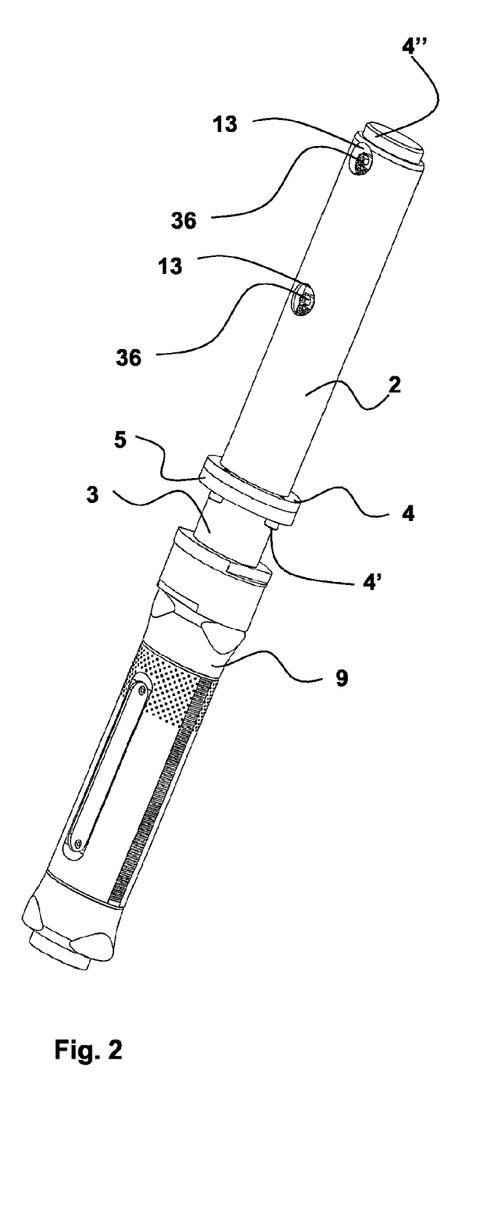
FIG. 2 is a perspective view of the gauge of FIG. 1, on a reduced scale and with some details added with respect to FIG. 1.

The checking apparatus of FIGS. 1 and 2, more specifically a plug gauge, has a support structure 1 with a base 3, substantially cylinder shaped, including a flange 5 that defines a bearing level surface 6.

A reference element 7 is coupled to the flange 5 by means of two screws 8 and defines a pair of reference seats 10, only one of them can be seen in FIG. 1. Two studs 11, 12 are aligned along a direction perpendicular to the surface 6, with end portions positioned in the reference seats 10, and define a longitudinal axis. A locking element 14 is similar in shape to the reference element 7 and defines a correspondent pair of seats 15 (only one of them can be partially seen in FIG. 1). The locking element 14 is coupled to the reference element 7 by means of two transversal screws (the number 17 in the figure refers to threaded holes that house end portions of the screws) and clamps the end portions of the studs 11, 12, that stand locked between the seats 10 and the seats 15, the latters standing opposite to one another.

The studs 11, 12, that are part of the support structure of the gauge, achieve a longitudinal guide that carries checking means of the gauge.

In the specific embodiment of the figure, which enables to check diametral dimensions of a hole (not shown) at two longitudinally-spaced apart cross-sections, the checking means include two measuring cells 20, 21. Being such cells 20, 21 substantially similar, the cell 20 only will be described.

Two armsets 24, 25, each of them including a pair of laminae 27, 28 parallel to each other with two reduced cross-sections or fulcra 30, 31, and, respectively, 32, 33, are coupled to a support element 22, for example by means of welding. Between the pairs of laminae 27, 28 at the ends opposite to the support element 22, there are coupled joining elements 35, which in turn carry, by means of an adjustable threaded coupling, feelers 36 aimed at contacting the surface of the hole to be checked. The so-called "parallelogram" structure of each armset 24, 25, wherein the fulcra 30-33 define four parallel axis of rotation, enables opposite displacements of the joining elements 35 and feelers 36, substantially along a same transversal measuring direction. A spring, not shown in the figure, is positioned between the armsets 24, 25 and provides a measuring force, by mutually displacing away the armsets and assuring the contact between the feelers 36 and the surface of the hole to be checked. A transducer 37, for example a linear inductive transducer of a known type, has mutually movable elements coupled to the joining elements 35 of the two armsets 24, 25. The transducer 37 provides, in a known way, by means of wires of a cable 38, electric signals indicative of the mutual position of the two feelers 36.

A limitation element 39, only partially visible in FIG. 1, is coupled to the support element 22 and includes mechanical surfaces that contact surfaces of the armsets 24, 25 to limit the displacement excursion of the feelers 36.

The cells 20, 21 are coupled to the support structure, more specifically to the studs 11, 12 by means of positioning and fastening components. More specifically, the checking means include positioning components 40 to which the support element 22 of each cell is rigidly coupled, fastened to such components by means of screws (not shown in FIG. 1) or integrally embodied therewith. Each of the positioning components 40, that is similar in shape to the reference element 7, has a pair of reference seats 42 (only one thereof can be partially seen in each of the two positioning components 40 shown in FIG. 1). A fastening component 44 is similar in shape to the positioning component 40 of the checking means and defines a corresponding pair of seats 46 (only one of them can be partially seen in each of the two fastening components 44 shown in FIG. 1). Each fastening component 44 is coupled to the positioning component 40 by means of a transversal screw 48. By tightening the screw 48, it is determined and fixed the position of the positioning component, and thus of the associated cell 20 or 21, along the longitudinal guide defined by the studs 11, 12, the latters standing at the seats 42, 46.

The gauge also includes a centering and protection nosepiece 2, shown in FIG. 2, that is hollow cylinder shaped, covers the set of cells 20, 21, the studs 11, 12, the reference element 7 and the locking element 14, and includes openings for the feelers 36 to pass. More specifically, the nosepiece 2 includes a flange 4 coupled to the flange 5 by means of clamping means 4' and a cap 4" to close a top part of the gauge. The nosepiece 2 has four holes (only two of them are visible in FIG. 2), two by two diametrically opposite, wherefrom the feelers 36 come out. A handgrip 9—for enabling the gauge to be manually operated by an operator—is coupled to the base 3 in a known way not illustrated in the figures.

The longitudinal position of the checking means, more specifically of the cells 20, 21, along the guide defined by the studs 11, 12 is chosen in such a way that, in the working condition when the gauge is inserted in a hole to be checked, the feelers 36 stand aligned along a diametral cross-section of the hole to be checked.

Figure 3:
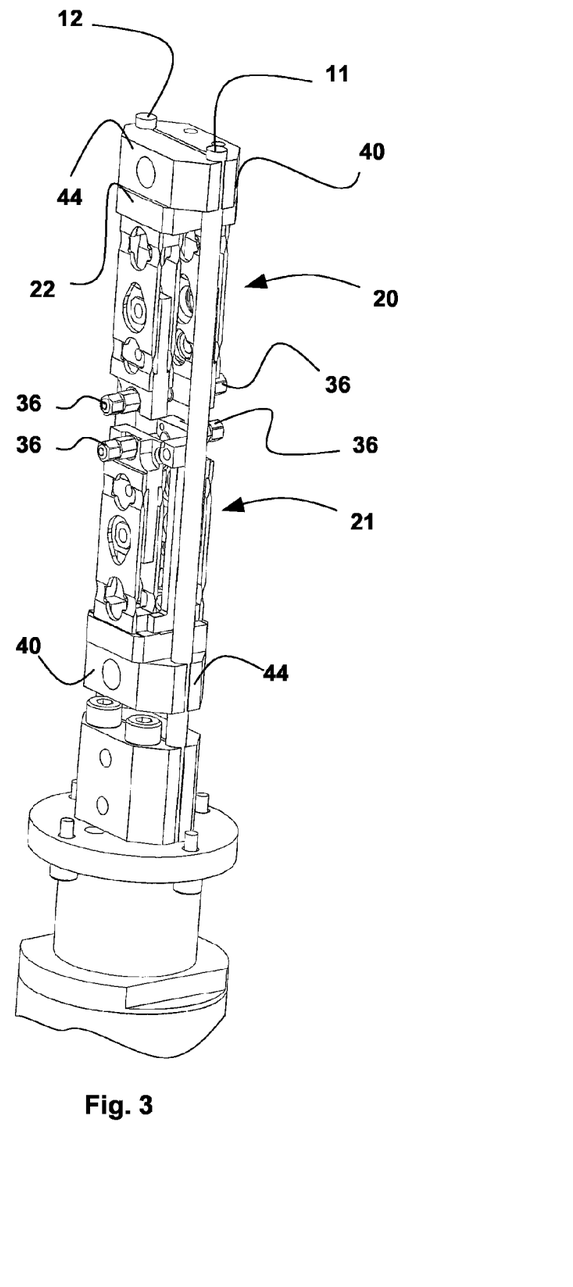
FIG. 3 is a partial perspective view of a gauge according to a second preferred embodiment of the invention, with some details omitted for the sake of clarity.

A gauge similar to that of FIG. 1 is shown in FIG. 3, wherein the two positioning components 40 are coupled to the studs 11, 12 with opposite orientation, so that the first measuring cell 20 is upside down with respect to the second measuring cell 21 and with respect to the configuration of FIG. 1. It should be noticed that, in the configuration of FIG. 3, the feelers 36 of the cells 20, 21 are close to each other and thus it is possible to carry out diametral checkings at cross-sections close to each other.

Figure 4:
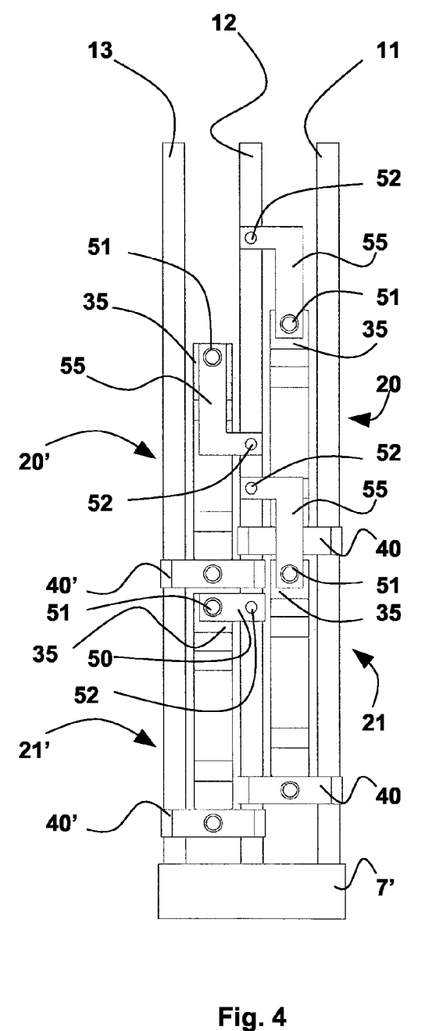
FIG. 4 is a side schematic view of a plug gauge with three studs and a specific configuration according to a third preferred embodiment of the invention.
Figure 5:
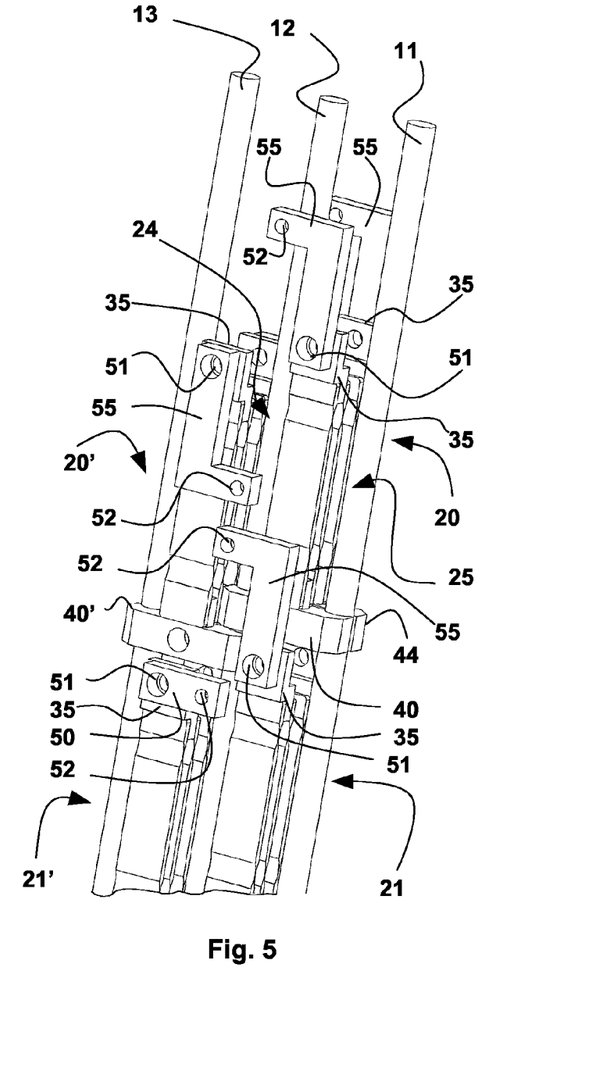
FIG. 5 is an enlarged, partial perspective view of some details of the gauge of FIG. 4.

In FIGS. 4 and 5, there is illustrated a gauge including checking means and other components identical or similar to components of the gauge of FIG. 1 and therefore such components are referenced to by the same numbers. More specifically, the gauge of FIGS. 4 and 5 includes a reference element 7' that clamps in dedicated seats (not visible in the figure) first end portions of three studs 11, 12, 13 in cooperation with a locking element (not visible in the figures as well) and similar to the locking element 14 of FIG. 1. It should be noticed that the element 7' and the corresponding locking element each include three seats for simultaneously locking the three studs 11, 12, 13, the seats being substantially similar to the seats 10, 15 of the elements 7, 14 of FIG. 1. The reference element 7', for example, is coupled to a base with a flange herein not illustrated, but similar to those of FIGS. 1 and 3, and is part of the support structure of the gauge. Although it is not illustrated in FIGS. 4 and 5, it can be foreseen, in order to further stiffen the gauge structure, to clamp second end portions of the three studs 11, 12, 13 between a reference element and a locking element quite similar to those that clamp the first end portions of the studs.

The positioning components 40 of the checking means are located on a pair of adjacent studs 11, 12 and are fastened in the proper position by means of fastening components 44 (only one can be partially seen in FIG. 5), the positioning components 40 and the fastening components 44 being substantially identical to those shown in FIGS. 1 and 3. A measuring cell 20, 21 is directly coupled to each pair formed by a positioning component 40 and the associated fastening component 44, each measuring cell 20, 21 comprising two armsets 24, 25 with parallelogram structure, as described with reference to FIG. 1. For the sake of simplicity and clarity, many details are omitted in FIGS. 4 and 5, as for example the holes for housing the transducer. It should be noticed that in the embodiment of FIGS. 4 and 5 the reference element 22 is missing, contrary to the embodiments of FIGS. 1 and 3, and the armsets 24, 25 are directly coupled to the associated positioning components 40 and fastening components 44, by means of welding, on suitable pins or reference guides, not shown in the figures. Since the armsets 24, 25 and the components 40, 44 are, respectively, substantially identical, it makes no difference which armset be coupled to the positioning component 40, or to the fastening component 44.

On the other pair of studs 12, 13 there are located two more positioning components 40' (substantially identical to the components 40), whereon there are coupled two more measuring cells 20', 21' (substantially identical to the cells 20, 21). As previously described with reference to FIG. 1, the cells 20, 21, 20', 21' include transducers and thrust springs that are not shown in FIGS. 4 and 5 for the sake of clarity.

As in the embodiments of FIGS. 1 and 3, each armset 24, 25 includes a joining element 35 which carries a feeler. In the embodiment of FIGS. 4 and 5—wherein the armsets 25 are totally or partially covered by the armsets 24—the feelers (not shown) are directly coupled by means of a threaded coupling to holes 52 of mechanical transmission elements 50, 55, the latters being of different shape and in turn coupled to the joining elements 35 of the cells 20, 21, 20 , 21'. More specifically, each of the mechanical transmission elements 50, 55 has a hole 51 for being fastened, by means of a screw not illustrated, to one of the joining element 35. The mechanical transmission element 50 has a rectangular narrow shape and is coupled to the cell 21', while the mechanical transmission elements 55 visible in FIGS. 4 and 5 are "L" shaped and are coupled to the cells 20, 20', 21. The mechanical transmission elements 50, 55 are coupled to respective armsets of the cells with suitable orientations in such a way that the threaded holes 52 be aligned along a same central longitudinal direction. Mechanical transmission elements, identical and symmetrically arranged with respect to those 50, 55 shown in the figures, are coupled to the joining elements 35 of the armsets 25 (just one element 55 is partially visible in FIG. 5). Thus, the eight feelers coupled to the respective holes 52 of the mechanical transmission element 50, 55 stand arranged at positions two by two opposite to one another with respect to the plane defined by the axes of the studs 11, 12, 13 (plane of FIG. 4) and can be arranged—in working conditions on a hole to be checked—on the cross-sections corresponding to the diameters to be checked. It should be noticed that it is particularly easy to check the diameter at cross-sections close to each other, thanks to the arrangement, shape and dimension of the mechanical transmission elements 50, 55 and the possibility to bring alongside the cells 20, 20' (and/or 21, 21') on the longitudinal double guide defined by the adjacent pairs of studs 11, 12 and 12, 13. By means of the same gauge, it is also possible to check three or four nearby cross-sections, by suitably modifying orientation, shape and dimensions of the mechanical transmission elements coupled to the cells 20, 20', 21, 21'. It is also possible to position the feelers close to each other at different longitudinal positions, so that the gauge results particularly flexible and suitable to check both through and dead holes.

Therefore, it is apparent that FIGS. 4 and 5 show just one possible example of the way in which, on the basis of the hole to be checked, different, simple component parts can be easily and rapidly assembled to obtain a precision gauge.

It should be noticed that the armsets of the parallelogram type of the cells 20, 20', 21, 21' enable to advantageously utilize the mechanical transmission elements 50, 55 of the illustrated type with no need to carry out compensations. In fact, in the parallelogram structure there is no need to allow for the so-called "arms ratio", i.e. the ratio between the displacement performed by the feeler and the corresponding relative displacement between mutually movable elements (e.g. a core and windings) of the transducer. In other words, the parallelogram structure enables to have a correspondence between the displacement of the feeler and the movement between the elements of the transducer that is substantially independent of the length of the arm that carries the feeler, more particularly of the distance between the displacement directions of the feeler and of the movable component of the transducer.

However, it is possible to utilize known armsets of a different type, for example of the so-called "lever" type, that include at least one arm rotating substantially about a single fulcrum, a feeler and a movable element of a transducer, both coupled to the arm. Cells including armsets of the lever type are advantageous with respect to those of the parallelogram type as far as reduced overall dimensions are concerned, but oblige to allow for alterations of the arms ratio introduced by the mechanical transmission elements 50, 55 and to vary accordingly the sensitivity of the transducer, for example by means of a potentiometer.

Figure 6:
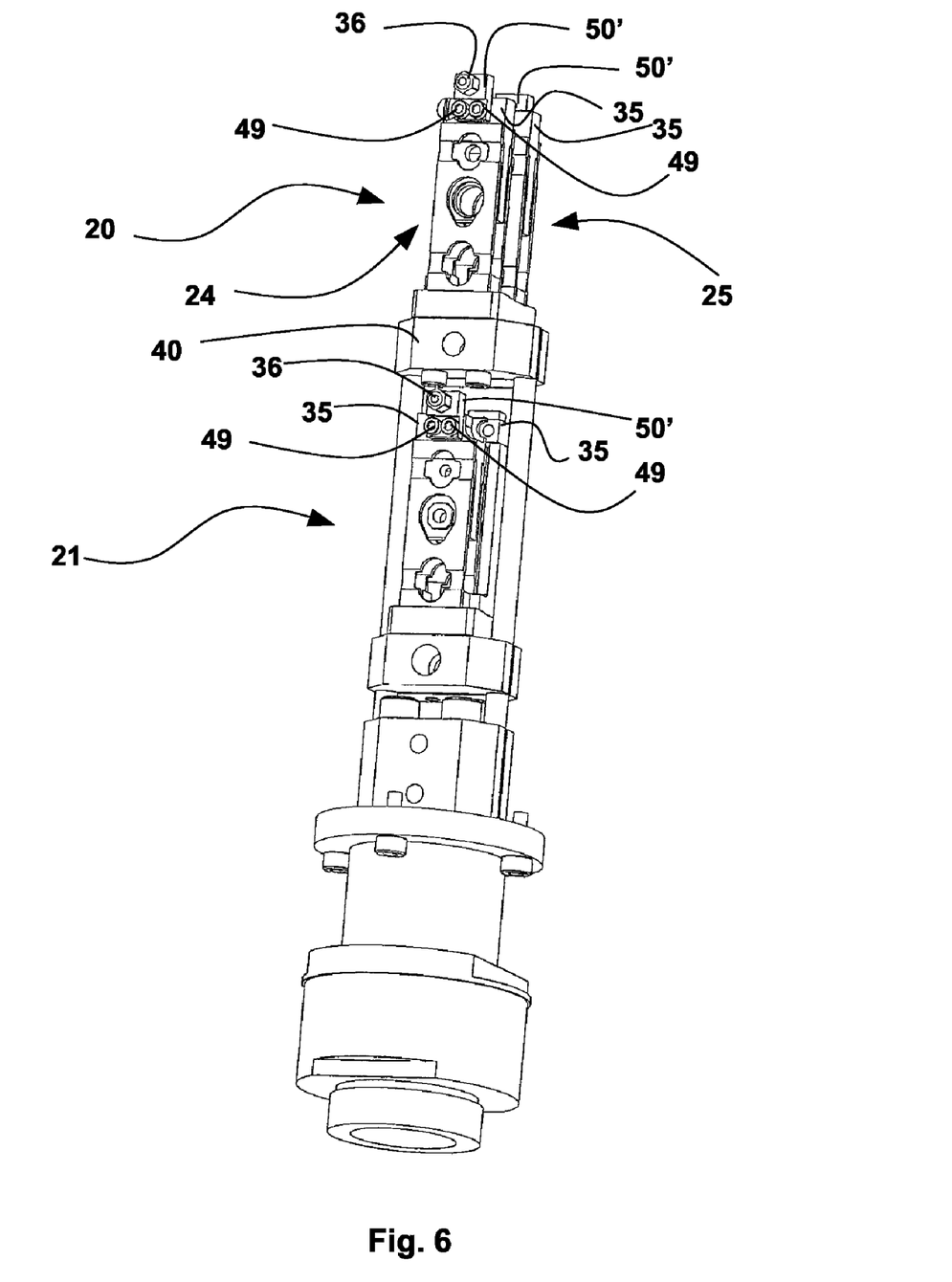
FIG. 6 is a different perspective view, on a reduced scale, of the gauge of FIG. 1, in a specific configuration, and with mechanical transmission elements added thereto.

FIG. 6 shows the gauge of FIG. 1, wherein mechanical transmission elements 50' are coupled by means of screws 49 to the joining elements 35 of the four armsets 24, 25 that are present. The elements 50' enable to arrange the feelers 36 away from the respective armsets 24, 25 and enable to vary the comparator configuration without modifying the position of the positioning components 40. In an alternative, not-illustrated embodiment, mechanical transmission elements in the cell 21 can be longer to arrange the associated feelers 36 near to the feelers of the cell 20 and perform, for example, checkings of diameters close to each other near the bottom of dead holes. It is also possible to couple mechanical transmission elements to joining elements 35 of the cell 20 with upside down orientation with respect to that shown in FIG. 6 and move the relative feelers 36 near to the feelers 36 of the cell 21.

Figure 7:
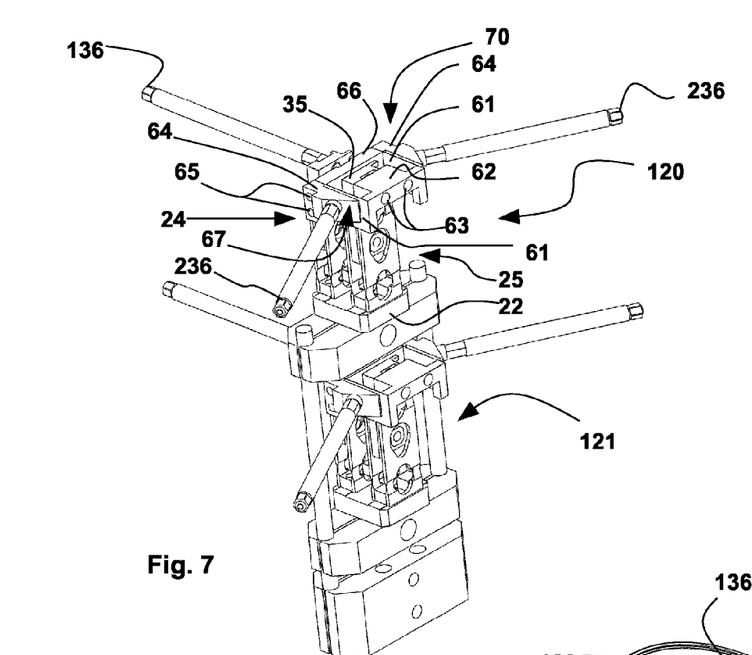
FIG. 7 is a perspective view of a plug gauge for checking dimensions and shape errors according to a fourth preferred embodiment of the invention, with some details omitted for the sake of clarity.

In FIG. 7, it is illustrated an embodiment of the plug gauge according to the invention particularly suitable for performing shape error checking, wherein each measuring cell 120, 121 carries three feelers 136, 236 arranged at 120° one from the other. It should be noticed that the feelers can be arranged at different angles too, depending on the checking to be performed. As the cells 120, 121 are substantially identical, just the cell 120 and its functioning will be described.

The cell 120 has many constructive aspects that are identical to those of the previously described cells 20, 21, and therefore some reference numbers of FIG. 1 are hereinafter utilized. The cell 120 includes two parallelogram armsets 24, 25, fixed to a support element 22, that enable translations along a measuring direction transversal to the axis of the gauge. A feeler 136 aligned along the measuring direction is directly coupled to the armset 24, while an adapting or "self-centering" system 70 is coupled to the armset 25. The self-centering system 70 carries a pair of fixed and angularly spaced apart feelers 236, typically at 120°. The system 70 includes a main body 62 provided with two threaded holes 63 for being fixed by means of screws not illustrated to the joining element 35 of the armset 25. First end portions of two resilient laminae 61, parallel to each other, are coupled to two opposite ends of the main body 62. Second end portions of the laminae 61 are locked between a secondary element 66 and support components 64, the latters being fixed to the secondary element 66 by means of screws not illustrated and seated in holes 65.

The main body 62, the secondary element 66 and the two laminae 61 form a closed structure of the parallelogram type with deformable portions, that enable the secondary element 66 and the support components 64 coupled thereto to translate along an adapting direction perpendicular to the measuring direction wherealong the feeler 136 is aligned and can translate. Each support component 64 includes an inclined surface 67 whereto the feelers 236 are fixed in a such a way that the three feelers 136, 236 be arranged at 120° one from the other. It is clear that it is possible to vary the angle between the feelers 236 coupled to the support components 64 by suitably choosing the inclination of the inclined surface 67 of each support component 64.

The system 70 assures the simultaneous contact of the three feelers 136, 236 to the wall of a hole to be checked, even if the plug gauge is inserted not perfectly coaxially with respect to the hole. In fact, if only one of the feelers 236 of the armset 25 contacts the wall of the hole (usually the feeler 136 of the armset 24 always contacts the wall), the secondary element 66 and the support components 64 can displace, under the force exerted by a spring (not illustrated) that acts between the armsets 24, 25, along the adapting direction towards a position wherein both of the feelers 236 of the armset 25 contact the wall of the hole. In other words, the first of the feelers 236 that contacts the wall of the hole can perform limited displacements along such wall and its proper position is determined when the other feeler 236 of the armset 25 also contacts the wall of the hole.

In substance, the adapting system 70 provides the feelers 236 of the armset 25 with an additional degree of freedom with respect to the feeler 136 of the armset 24, namely the possibility of further translating along the adapting direction. This allows the three feelers 136, 236 to "self-center", i.e. to mutually displace till reaching a configuration wherein such feelers 136, 236 simultaneously contact the wall of the hole, with no need to perform further adjusting operations, manually or by means of external devices.

It should be noticed that, thanks to the specific geometry of the system 70, as a consequence of the contact between the feelers 236 and the wall of the hole to be checked, the laminae 61 are generally stressed by tensile stress and never by compressive stress. This aspect is very important for the proper functioning of the gauge, both in terms of measurement quality and duration in time of the apparatus. In alternative embodiments, the laminae 61 that provide the additional degree of freedom can be associated to other components that carry the feelers, instead of directly to the feelers, and so obtaining an analogous technical effect.

Figure 10:
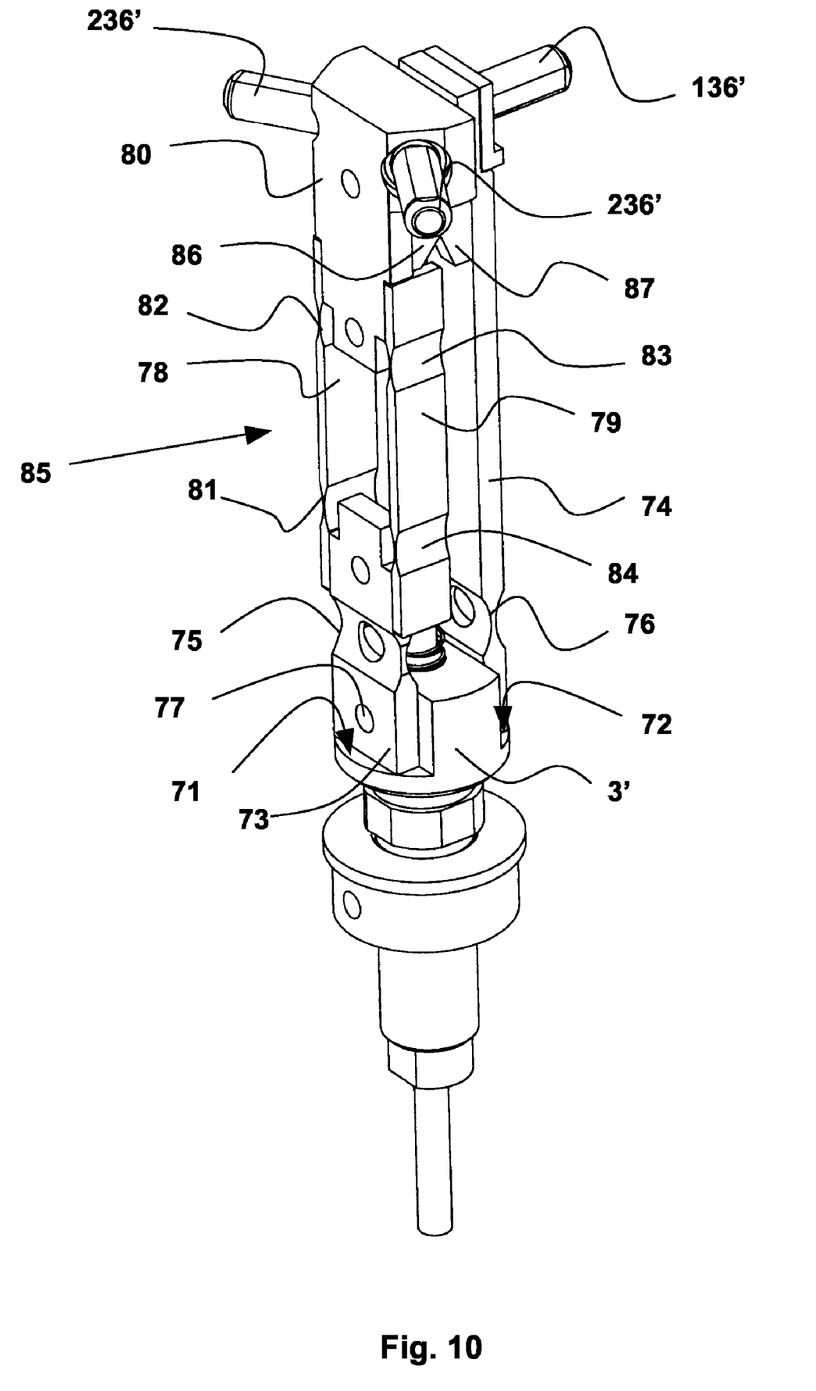
FIG. 10 is a perspective view of a plug gauge according to a seventh preferred embodiment of the invention, with some details omitted for the sake of clarity.

In FIG. 10, for example, there is illustrated a mechanical plug gauge according to the invention with armsets of the lever type, wherein laminae 78, 79 are associated to an arm 73.

More specifically, the plug gauge of FIG. 10 includes a base 3' that defines two reference surfaces 71, 72 whereon first end portions of arms 73, 74, respectively, abut and are fixed by means of screws not illustrated, housed in holes 77 (only one is visible in the figure).

Each arm 73, 74 includes a fulcrum 75, 76, whereabout it can rotate. A feeler 136' is coupled, by means of an adjustable coupling, to a second end portion of the arm 74. The arm 73 is formed of a first portion, including the fulcrum 75, a joining element 80, that carries, by means of an adjustable coupling, two feelers 236', and a couple of laminae 78, 79, arranged one parallel to the other, between said first portion and the joining element 80. The feelers 136', 236' are arranged at 120° one from the other. It is possible to modify the angular arrangement of the feelers 136', 236', by suitably shaping the element 80.

The arm 74 carries a first element 87 with a first inclined surface, which is opposed to a second inclined surface of a second element 86 coupled to the joining element 80 in such a way that the inclined surfaces form a Vee-shaped seat, whereon a ball of a mechanical transmission system of a known type (therefore not detailed illustrated) is engaged.

The laminae 78, 79, that include deformable portions with two fulcra 81, 82 and, respectively, 83, 84 each, along with the first portion of the arm 73 and the joining element 80 implement a parallelogram structure 85. A spring, not illustrated, enable the arms 73, 74 to rotate about the respective fulcra 75, 76, providing a suitable measuring force. By virtue of the small rotations that are involved, the relative feelers 136', 236' perform, with optimum approximation, translation movements, along a measuring direction.

The feelers 236', thanks to the parallelogram structure 85, are able to translate not only along the measuring direction, but also along an adapting direction, that is perpendicular to such measuring direction. In substance, the feelers 236' have two degrees of freedom, while the feeler 136' has only one degree of freedom.

Analogously to what has been described with reference to the adapting system 70 of FIG. 7, such two degrees of freedom associated to the feelers 236' enable the three feelers 136', 236' to assume a position within the hole to be checked wherein all the feelers contact the wall of the hole, even if the plug gauge is not accurately inserted in the hole.

It is also possible to substitute the arm 74 with an arm substantially identical to the arm 73, with two laminae substantially similar to the laminae 78, 79 and a suitably shaped joining element that implement a parallelogram structure substantially similar to the structure 85. The joining element can be similar to the element 80, or can be differently shaped to carry one feeler only, parallel to the measuring direction. Such embodiment of plug gauge assures the pair of feelers 236' to properly contact the wall of the hole and enables to minimize the chord error, by enabling the feeler 136' to place itself in diametral position with respect to such pair.

A further alternative embodiment (not illustrated) foresees a mechanical plug gauge with armsets of the lever type, wherein an adapting system similar to the adapting system 70 of FIG. 7 is coupled to an arm of the armsets.

Figure 8:
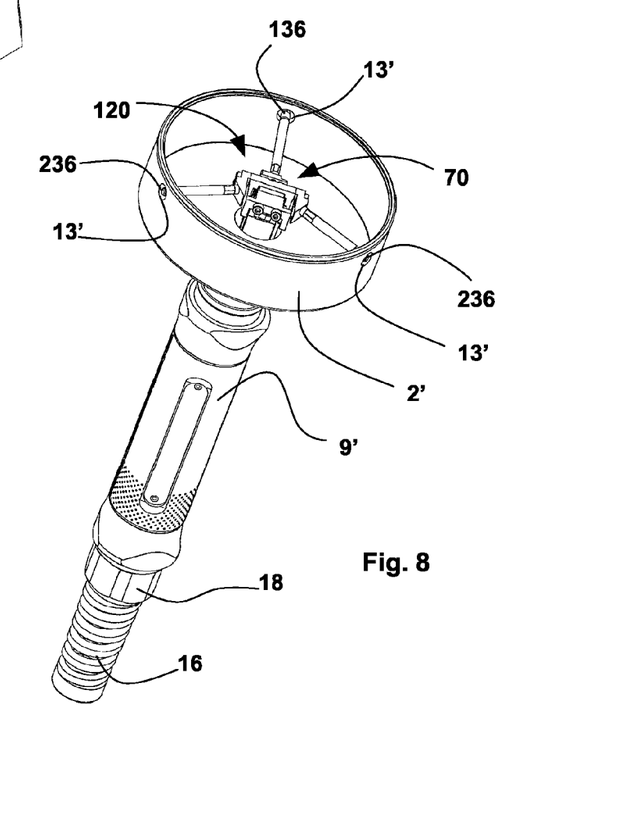
FIG. 8 is a perspective view of a plug gauge for checking dimensions and shape errors according to a fifth preferred embodiment of the invention.

In FIG. 8 there is illustrated a plug gauge including checking means with only one measuring cell 120 quite similar to that described with reference to FIG. 7. The cell 120 includes the three feelers 136, 236 and the adapting system 70 that enables the three feelers to self-center in the hole to be checked.

A nosepiece 2' (whose top is not illustrated for the sake of clarity) is positioned to protect the cell 120 and includes three holes 13' for the feelers 136, 236 to pass. The gauge also includes a handgrip 9' to which a spring 16 is coupled, by means of a ring nut 18, for protecting electric wires (not illustrated) that connect transducer means within the gauge to power, processing and display systems (not illustrated as well).

In substance, it is possible to embody measuring apparatuses, for example plug gauges, wherein the adapting system is arranged close to the feeler(s), as in the plug gauges with parallelogram armsets illustrated in FIGS. 7 and 8, or in a different position of the armset, as in the mechanical plug gauge illustrated in FIG. 10. Moreover, a gauge according to the invention can include one or more adapting system 70 and/or 85 coupled to armsets, that can be, as previously stated, of the parallelogram and/or lever type. The person skilled in the art can choose the proper configuration of the gauge on the basis of convenience and overall dimensions criteria.

Figure 9:
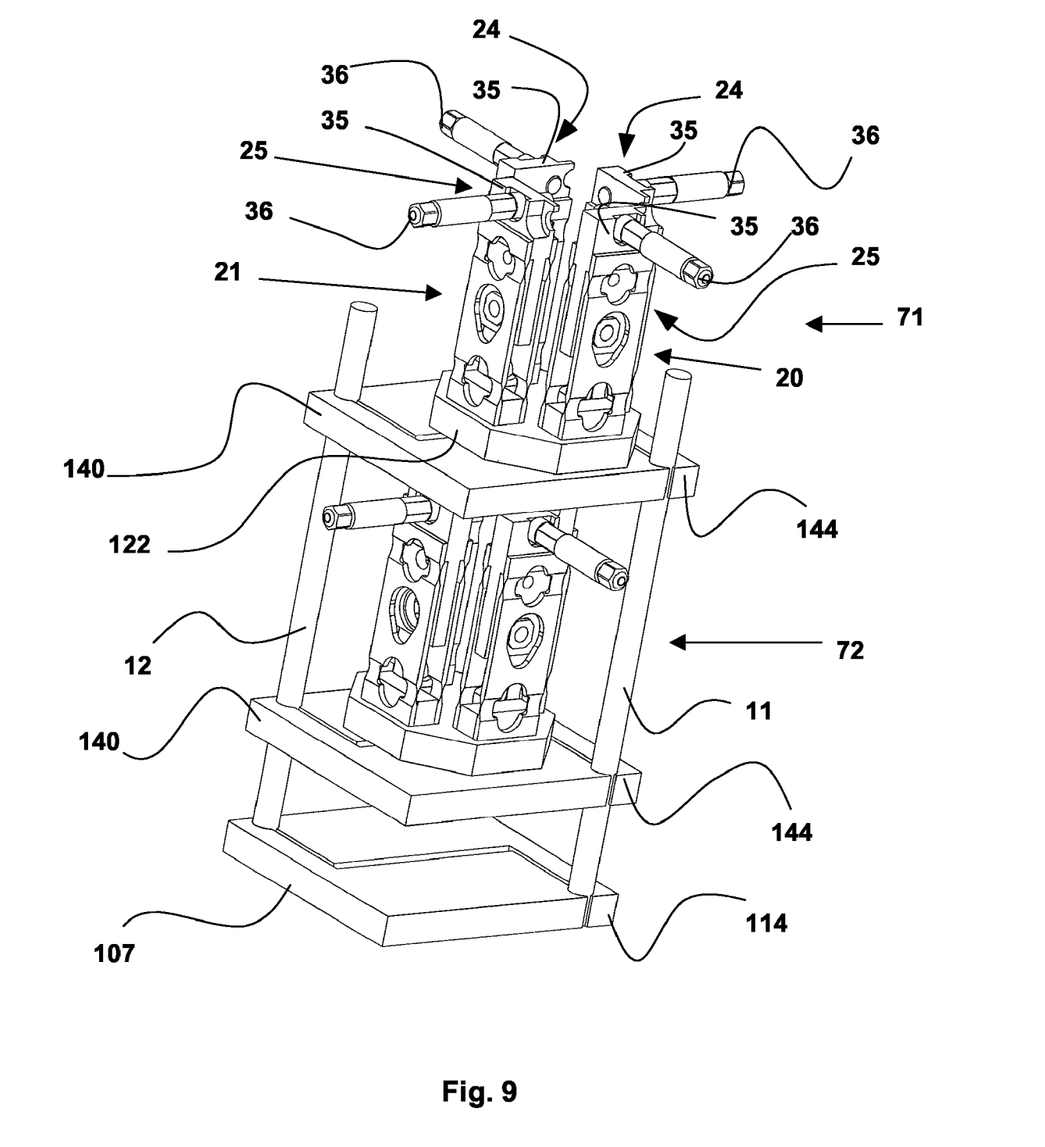
FIG. 9 is a perspective view of a plug gauge for checking perpendicular diametral dimensions, according to a sixth preferred embodiment of the invention, with some details omitted for the sake of clarity.

In FIG. 9 there is shown a plug gauge, wherein the two studs 11, 12 are locked between a reference element 107 and a locking element 114 by means of screws not illustrated. The reference element 107 and the locking element 114 are just formally different from the elements 7 and 14 of FIG. 1, but the associated seats where the studs 11, 12 are locked are substantially identical. The studs 11, 12 carry two substantially identical measuring groups 71, 72, so that just the group 71 will be described, although the description is meant to refer to the group 72 as well.

The group 71 includes a positioning component 140 and a fastening component 144 which are locked at a certain height of the studs 11, 12, by means of screws not illustrated, in a way that is analogous to what has been described with reference to FIG. 1 for the substantially similar components 40, 44.

To the positioning component 140 there is coupled a support element 122 whereon there are fixed two measuring cells 20, 21, substantially identical to those illustrated in FIG. 1, both including two opposite measuring armsets 24, 25 with parallelogram structure. To each armset 24, 25 there is coupled a joining element 35 that carries, by means of an adjustable, threaded coupling, a feeler 36. Therefore, the feelers 36 of a same cell stand aligned along an aligning direction, perpendicular to the aligning direction of the feelers of the other cell and enable to check diametral dimensions, that are mutually perpendicular on a same cross-section.

It is apparent the constructive and assembly simplicity of a gauge according to the invention and the numerous possibilities of prompt composition in relation to the characteristics of the hole to be checked, as it is possible to modify the position, number, dimensions or structure of the utilized checking means. In fact, other cells of known type can replace the cells 20, 21, 20', 21', 120, 121 herein illustrated and described. For example, in order to vary the longitudinal dimension of the gauge, studs 11, 12, 13 of different length can be coupled to the base 3 by means of particularly simple replacement operations. In this way, a different number of cells can be mounted.

Moreover, there are apparent advantages regarding the possibility to standardize a line of gauges of this type. In fact, a set of standard components can be composed according to numerous configurations to satisfy all possible needs.

As already stated, gauges according to the invention can include components with dimensions, shape and arrangement that are quite different to those shown, just as example, in the figures. For example, plug gauges including positioning and fastening components with three or more seats for simultaneously locking three or more studs are within the scope of the invention.

Besides resilient laminae, other components can be used to form the structure of the parallelogram type of the adapting system used in the present invention; for example, rigid elements can be coupled to ball bearings and/or bushings that represent fulcra of a parallelogram structure.

If short translations of the feelers along the adapting direction are involved, i.e. when small clearance exists between the feelers and the piece to be checked, the structure of the parallelogram type used in the adapting system of a checking apparatus according to the invention can be replaced by a structure of the lever type, for example with a deformable portion.

The plug gauge of the present invention can advantageously be utilized, manually or by means of known automatic controls, for checking diameters, as well as for checking shape errors of holes, either smooth or grooved. In the first case, the gauge can assume, for example, one of the configurations shown in the FIGS. 1-6 and 9 with pairs of measuring armsets with only one feeler coupled to each armset. In the second case, for example, at least one of the two armsets of the pair can carry two feelers, as shown in FIGS. 7, 8 and 10. Certainly, mixed configurations are possible as well, e.g. configurations including pairs of armsets for checking diameters and pairs of armsets for checking shape errors.

A gauge according to the invention can be also utilized—in a known procedure and eventually along with suitable checking and control devices—for verifying geometrical features of holes, as for examples roundness and concentricity, at one or more cross-sections.

As it can be clearly understood, there is provided a highly modular and flexible gauge, that can include two or more studs, feelers directly coupled in an adjustable way to joining elements, and/or feelers coupled to mechanical transmission elements with suitable shape and dimension for positioning the feelers where are required, for example along the same direction, or at different cross-sections.

The optimum configuration for a specific checking can be chosen by the person skilled in the art by suitably moving the positioning components, orientating the measuring cells, choosing shape, dimension and orientation of the mechanical transmission elements, if any, and coupling adapting systems (if need be) to the feelers. Thus, the same gauge can be differently configured for checking diameters at different depth, diameters with variable interaxis, shape errors and other geometrical features of holes, either smooth or grooved, both before and after the machining in machine tools.

It should be noticed that some embodiments are illustrated in the enclosed sheets of drawings in an extremely schematic way, for example without the centering and protection nosepiece, which is generally foreseen in all of the different embodiments.

Gauges with one or more longitudinal guides implemented with elements that are different from the studs 11, 12, 13 illustrated in the drawings, for example shafts or beams of different cross-section and shape, and suitably configured positioning and fastening components, are within the scope of the present invention.

Apparatuses for checking dimensions and/or shape errors of holes that are different from the gauges, for example including measuring devices able to provide information regarding the absolute dimensions of the parts to be checked, are within the scope of the invention as well.

Moreover, checking apparatuses that, according to the invention, include an adapting or self-centering system, can have various structure and components, for example with armsets and feelers for checking external dimensions.

The invention claimed is:

1. An apparatus for checking diametral dimensions and/or shape errors of a mechanical piece, with a support structure including a longitudinal guide defining a longitudinal axis, checking means with at least one positioning component, and at least one cell including at least two feelers adapted for contacting the surface of the piece, and at least one transducer adapted for providing electric signals indicative of the position of the feelers, the checking means being coupled to the longitudinal guide in an adjustable way along said longitudinal axis, wherein at least one fastening component is provided, said at least one fastening component being adapted to cooperate with said at least one positioning component to clamp and release the checking means with respect to the longitudinal guide.

2. The apparatus according to claim 1, wherein the checking means include two or more cells coupled to said longitudinal guide in an adjustable way.

3. The apparatus according to claim 2, wherein two of said two or more cells are coupled to said longitudinal guide with opposite orientation.

4. The apparatus according to claim 1, wherein said checking means are coupled to said longitudinal guide in a removable way.

5. The apparatus according to claim 1, wherein said at least one positioning component and said at least one fastening component comprise corresponding reference seats, said at least one positioning component and said at least one fastening component being clamped to the longitudinal guide at said seats and on opposed sides of said longitudinal guide.

6. The apparatus according to claim 5, wherein said at least one fastening component and said at least one positioning component are clamped to the longitudinal guide by means of a transversal screw.

7. The apparatus according to claim 1, wherein said longitudinal guide includes studs, in number of two or more, arranged parallel to said longitudinal axis.

8. The apparatus according to claim 7, wherein said studs are in number of three and said longitudinal guide is a double longitudinal guide.

9. The apparatus according to claim 7, wherein said support structure includes a base, said studs being coupled to the base in a removable way.

10. The apparatus according to claim 9, including a reference element coupled to the base and a locking element, the reference element and the locking element being adapted for mutually cooperating to define and fix the position of said studs with respect to the base.

11. The apparatus according to claim 1, wherein said at least one cell includes at least one pair of armsets, each armset of said at least one pair carrying at least one feeler of said at least two feelers, and enabling displacements along a transversal measuring direction.

12. The apparatus according to claim 11, wherein each armset of said at least one pair of armsets has a parallelogram structure.

13. The apparatus according to claim 11, wherein each armset of said at least one pair of armsets is of the lever type.

14. The apparatus according to claim 11, wherein at least one armset of said at least one pair of armsets includes a mechanical transmission element, said at least one feeler being coupled to the mechanical transmission element.

15. The apparatus according to claim 11, wherein at least one armset of said at least one pair of armsets carries a pair of feelers arranged in a fixed way and angularly spaced apart one from the other.

16. The apparatus according to claim 15, including an adapting system between said at least one armset and said pair of feelers.

17. The apparatus according to claim 16, wherein said adapting system includes a structure of the parallelogram type.

18. The apparatus according to claim 17, wherein said structure of the parallelogram type enables said pair of feelers to move substantially along an adapting direction perpendicular to said transversal measuring direction.

19. The apparatus according to claim 17, wherein said structure of the parallelogram type includes two laminae.

20. A checking apparatus comprising feelers in number of two or more, said feelers being enabled to move in a measuring direction, a position transducer providing electric signals indicative of mutual displacements of said feelers along said measuring direction, and an adapting system coupled to at least one feeler out of said feelers and enabling said at least one feeler to move substantially along an adapting direction perpendicular to said measuring direction.

21. The checking apparatus according to claim 20, wherein said adapting system includes a structure with at least one fulcrum.

22. The checking apparatus according to claim 20, wherein said adapting system includes at least one deformable portion.

23. The checking apparatus according to claim 20, including at least one movable arm carrying said at least one feeler, wherein said adapting system is coupled to said at least one movable arm.

24. The checking apparatus according to claim 23, wherein said at least one movable arm is of the lever type.

25. The checking apparatus according to claim 20, wherein two of said feelers are coupled to said adapting system and are angularly arranged with respect to each other.

26. The checking apparatus according to claim 20, including at least two of said feelers and being adapted for checking internal diametral dimensions of mechanical pieces.

27. A checking apparatus comprising feelers in number of two or more, a position transducer providing electric signals indicative of mutual displacements of said feelers along a measuring direction, and an adapting system coupled to at least one feeler out of said feelers and enabling said at least one feeler to move substantially along an adapting direction perpendicular to said measuring direction, wherein said adapting system includes a structure of the parallelogram type.

28. The checking apparatus according to claim 27, wherein said structure of the parallelogram type includes four fulcra.

29. A checking apparatus comprising feelers in number of two or more, a position transducer providing electric signals indicative of mutual displacements of said feelers along a measuring direction, at least one moveable arm carrying at least one feeler out of said feelers, and an adapting system coupled to at least one moveable arm and enabling said at least one feeler to move substantially along an adapting direction perpendicular to said measuring direction, the checking apparatus further including an armset of the parallelogram type, defining said at least one movable arm.

* * * * *